US005486956A

United States Patent [19]

Urata

[11] Patent Number: 5,486,956

[45] Date of Patent: Jan. 23, 1996

[54] DIGITAL SIGNAL REPRODUCING CIRCUIT WHICH COUNTS THE INCREASING AMOUNT OF BRANCH METRIC TO CONTROL AN EQUALIZER

[75] Inventor: Kaoru Urata, Kanagawa, Japan

[73] Assignee: Sony Corporation, Tokyo, Japan

[21] Appl. No.: 148,344

[22] Filed: Nov. 8, 1993

[30] Foreign Application Priority Data

Nov. 13, 1992 [JP] Japan .................................... 4-328620

[51] Int. Cl.[6] ............................. G11B 5/035; G11B 5/09; H03D 1/00

[52] U.S. Cl. ................................ 360/65; 360/46; 375/341

[58] Field of Search ................................. 360/32, 46, 48, 360/65, 53; 375/230, 232, 292, 341; 371/5.1; 369/53

[56] References Cited

U.S. PATENT DOCUMENTS 5,287,385 2/1994 Sugawara et al. ........................ 375/12

5,400,189 3/1995 Sato et al. ................................ 360/65

OTHER PUBLICATIONS

Cioffi et al. "Adaptive Equalization in Magnetic–Disk Storage Systems" Feb. 1990 IEEE Comm. Mag. pp. 14–29.

*Primary Examiner*—Aristotelis Psitos
*Assistant Examiner*—W. Chris Kim
*Attorney, Agent, or Firm*—Jay H. Maioli

[57] ABSTRACT

A digital signal reproducing circuit for reproducing a digital signal recorded on a recording medium, includes: an equalizing circuit for receiving a reproduced RF signal and varying at least one of gain characteristics and phase characteristics thereof with a control signal; a Viterbi decoder for receiving the output signal of the equalizing circuit; and a control unit for generating a control signal for the equalizer, wherein the control unit is adapted to control the equalizer so as to minimize a metric increasing amount of the Viterbi decoder.

3 Claims, 4 Drawing Sheets

ACSU 14
LATCH
LATCH
MSB
MSB
MSB
MSB
TO COUNTER 6
21
22
23
24
25
26
27
28
29
30
31
32
33
34

DIGITAL SIGNAL REPRODUCING CIRCUIT WHICH COUNTS THE INCREASING AMOUNT OF BRANCH METRIC TO CONTROL AN EQUALIZER

BACKGROUND OF THE INVENTION

1. Field of the Invention

The present invention relates to a digital signal reproducing circuit for reproducing a digital signal recorded on a magnetic tape, in particular, to such digital signal reproducing circuit using Viterbi code.

2. Description of the Prior Art

In a digital magnetic recording/reproducing apparatus as in a digital VTR, an equalizer is used to increase recording density and decrease error rate. In addition, construction which automatically and optimally controls the characteristics of an equalizer is known. Moreover, another decoding technique has been proposed. In this technique, intersymbol interference and non-linear distortion are expressed by automaton. The resultant data is decoded by applying the Viterbi algorithm. This technique is superior to conventional bit-wise determination technique.

FIG. 1 is a block diagram showing the construction of an example of a digital VTR reproducing circuit having a conventional automatic equalizer. In this circuit, a signal reproduced by a reproducing head 41 is sent to an equalizer 43 through a reproducing amplifier 42. The output signal of the equalizer 43 is sent to a channel decoder 44 which decodes a channel-encoded signal. The output signal of the channel decoder 44 is sent to an error correcting circuit 45 which decodes error-correction code. The resultant error corrected data is sent to a deshuffling/concealment circuit 46. The deshuffling process is the reverse process of the shuffling process which is performed on the recording side. Thus, the data sequence is restored to the original sequence. The error concealment process conceals error data, which has not been corrected by the error correction code, with correct data around the error data. The output data of the deshuffling/concealment circuit 46 is sent to a D/A converter 47 which converts the digital signal into an analog signal. The analog signal is obtained from an output terminal 48.

In the above-described digital VTR reproducing circuit, the error correcting circuit 45 detects an error of reproduced data and generates an error flag which represents whether or not such an error is present. Using this error flag, the error correction is performed. The error flag signal is sent to an arithmetic control circuit 49. A reset or enable signal or enable signal received from a terminal 50 is sent to the arithmetic control circuit 49. The arithmetic control circuit 49 calculates an error rate in a predetermined period (for example, an error rate per track of the magnetic tape). Thereby, a control signal which causes the error rate to be minimized is generated. With the control signal, gain characteristics and phase characteristics of the equalizer are controlled.

In the conventional construction, to accomplish highly accurate control, the error rate should be accurately detected. Thus, many data are required, thereby lowering response of the control. For example, it is experimentally known that to have an accuracy on the order of $2\times10^{-6}$ of error rate, reproduced data of 10 tracks is required. In addition, the error rate tends to be adversely affected by a drop-out. Thus, even if the amount of data for detecting the error rate is increased, the controling accuracy of the equalizer is not proportionally improved.

OBJECTS AND SUMMARY OF THE INVENTION

An object of the present invention is to provide a control circuit for forming a control signal with a small amount of reproduced data and having a resistance against the adverse effects caused by a drop-out.

The present invention is a digital signal reproducing circuit for reproducing a digital signal recorded on a recording medium, comprising an equalizing circuit for receiving a reproduced RF signal and varying at least one of gain characteristics and phase characteristics thereof with a control signal, a Viterbi decoder for receiving the output signal of the equalizing circuit, and a control unit for generating a control signal for the equalizer, wherein the control unit is adapted to control the equalizer so as to minimize a metric increasing amount of the Viterbi decoder.

The increasing amount of the metric of the Viterbi decoder strongly correlates to equalizing characteristics and noise. When the equalizing characteristics are controlled in such a way that the increasing amount of the metric is minimized, the Viterbi decoder can be automatically and precisely controlled.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
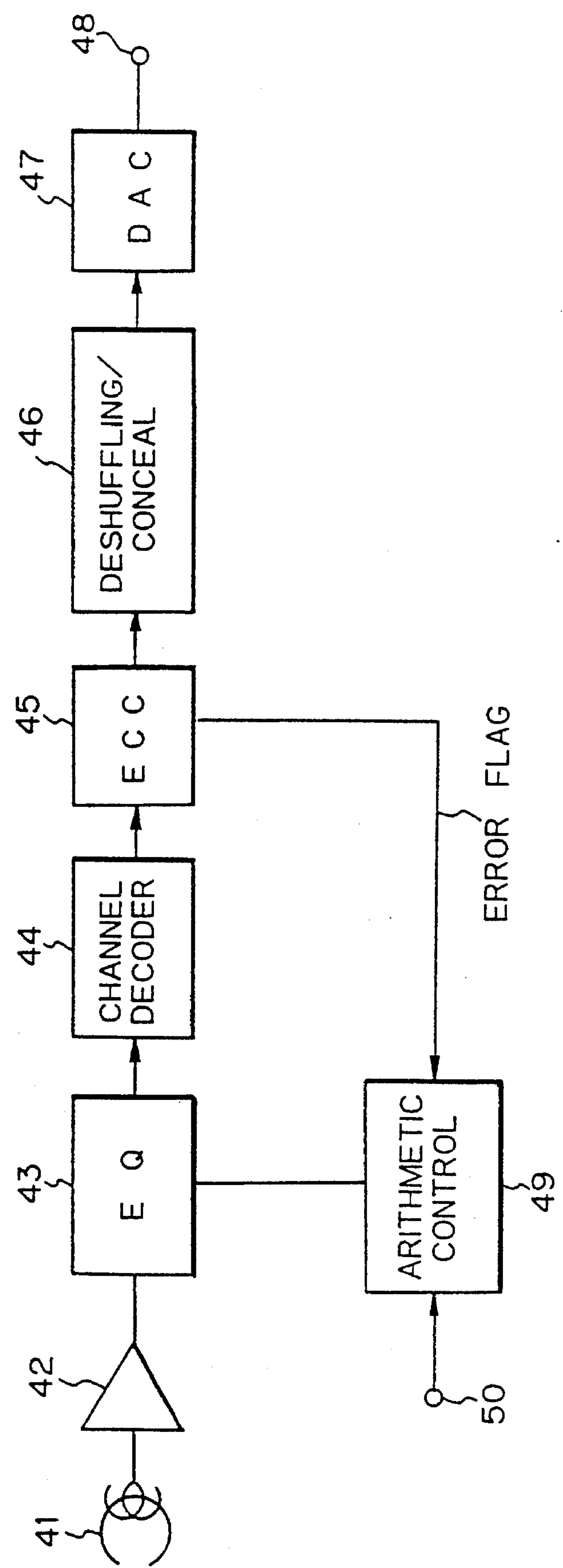
FIG. 1 is a block diagram showing an example of a conventional digital signal reproducing circuit.
Figure 2:
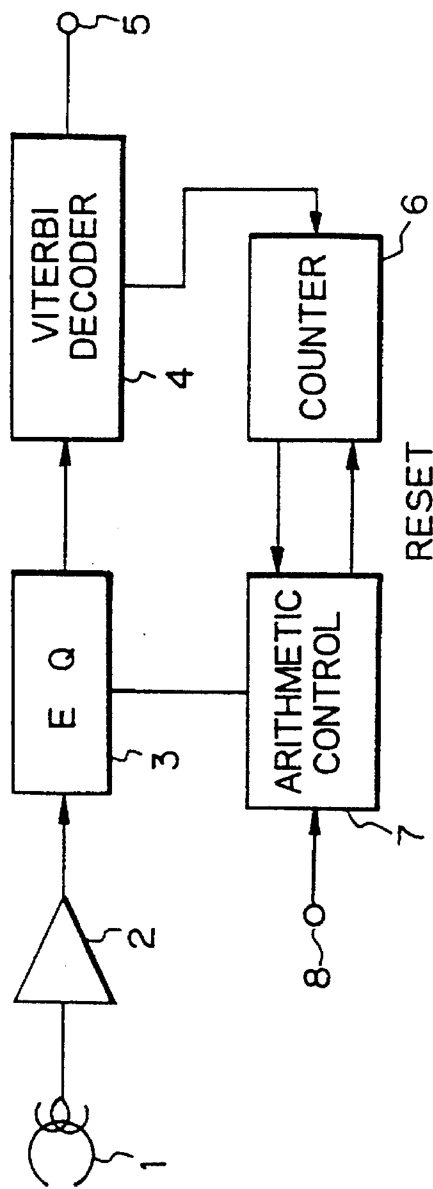
FIG. 2 is a block diagram showing a digital signal reproducing circuit according to a first embodiment of the present invention.

Next, with reference to the accompanying drawings, an embodiment of the present invention will be described. FIG. 2 shows a reproducing circuit of a digital VTR according to the embodiment of the present invention. In FIG. 2, reference numeral 1 is a reproducing magnetic head. Reference numeral 2 is a reproducing amplifier. Reference numeral 3 is an equalizer. In the digital VTR, since the bit rate of record data is relatively high, a plurality of rotating heads are used. Record data of one field is recorded on a magnetic tape as a plurality of slant tracks. For the sake of simplicity, the figure shows the magnetic head 1 as a single head.

The equalizer 3 may be an integrating equalizer, a partial response type equalizer (for example, PR (0, 1, −1) type), or a duo-binary type equalizer. In the equalizer 3, gain-to-frequency characteristics and/or phase-to-frequency characteristics are varied with control signals (which will be described later). The output signal of the equalizer 3 is sent to a Viterbi decoder 4. The Viterbi decoder 4 obtains likelihood status transition of the status sequence of data pattern of the detected bits according to the Viterbi algorithm so as to select the maximum likelihood decode sequence. The Viterbi decoder 4 sends reproduced data to an output terminal 5.

An arithmetic control circuit 7 generates control signals which control the equalizer 3. For example, the arithmetic control circuit 7 is constructed of a CPU. A counter 6 which is electrically connected to the Viterbi decoder 4 detects the increasing amount of metric. The output signal of the counter 6 is sent to the arithmetic control unit 7. The counter 6 receives a reset signal from the arithmetic control circuit 7. The reset signal defines the period of the count operation. The arithmetic control circuit 7 receives a switching pulse which synchronizes with the rotation phase of the magnetic head 1 from an input terminal 8. The level of the switching pulse is reversed whenever the magnetic head 1 scans a track. Thus, the increasing amount of metric is detected for each track.

Figure 3:
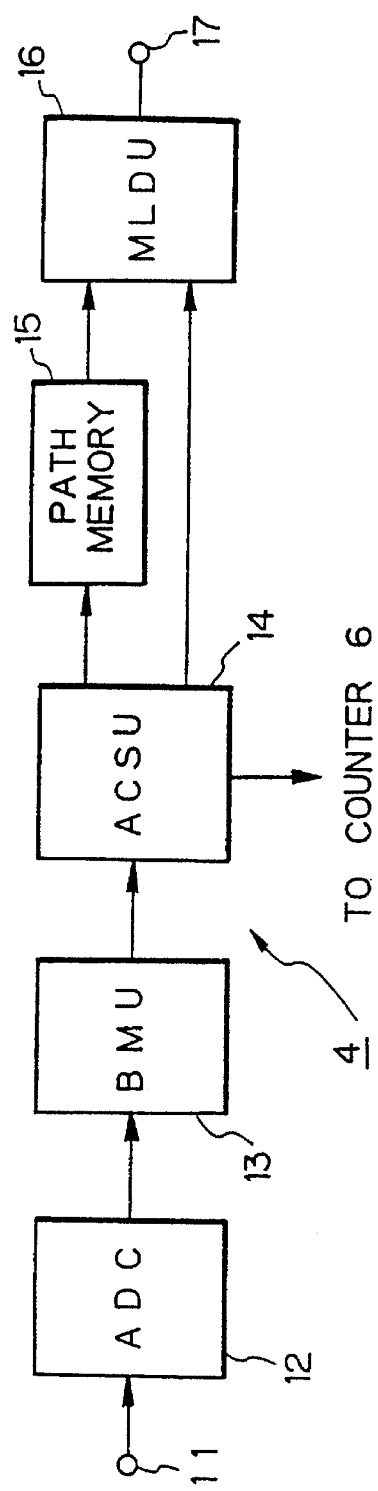
FIG. 3 is a block diagram showing an example of a Viterbi decoder.

FIG. 3 shows an example of the Viterbi decoder 4. The output signal of the equalizer 3 is sent to an A/D converter 12 through an input terminal 11. The A/D converter 12 quantizes the reproduced data. The output data of the A/D converter 12 is sent to a branch metric count unit 13. The output signal of the the branch metric count circuit 13 is sent to an add/compare/select unit 14. The add/compare/select unit 14 sums the branch metric so as to calculate resultant path metric.

Thus, the add/compare/select circuit 14 generates the path selection signal and the path metric. The path selection signal is sent to a path memory unit 15. The path memory unit 15 sends a most likelihood path to a maximum likelihood decision unit 16. The maximum likelihood decision unit 16 receives the output signal of the path memory unit 15. Thus, the maximum likelihood decision unit 16 decides a decoded output from the survivor paths and sends the resultant data to an output terminal 17. This viterbi decoder is described in "NIKKEI ELECTRONICS" Sep. 30, 1991, NO. 537, pp 316–325 and Sep. 14, 1991, NO. 538, pp 270–278.

Figure 4:
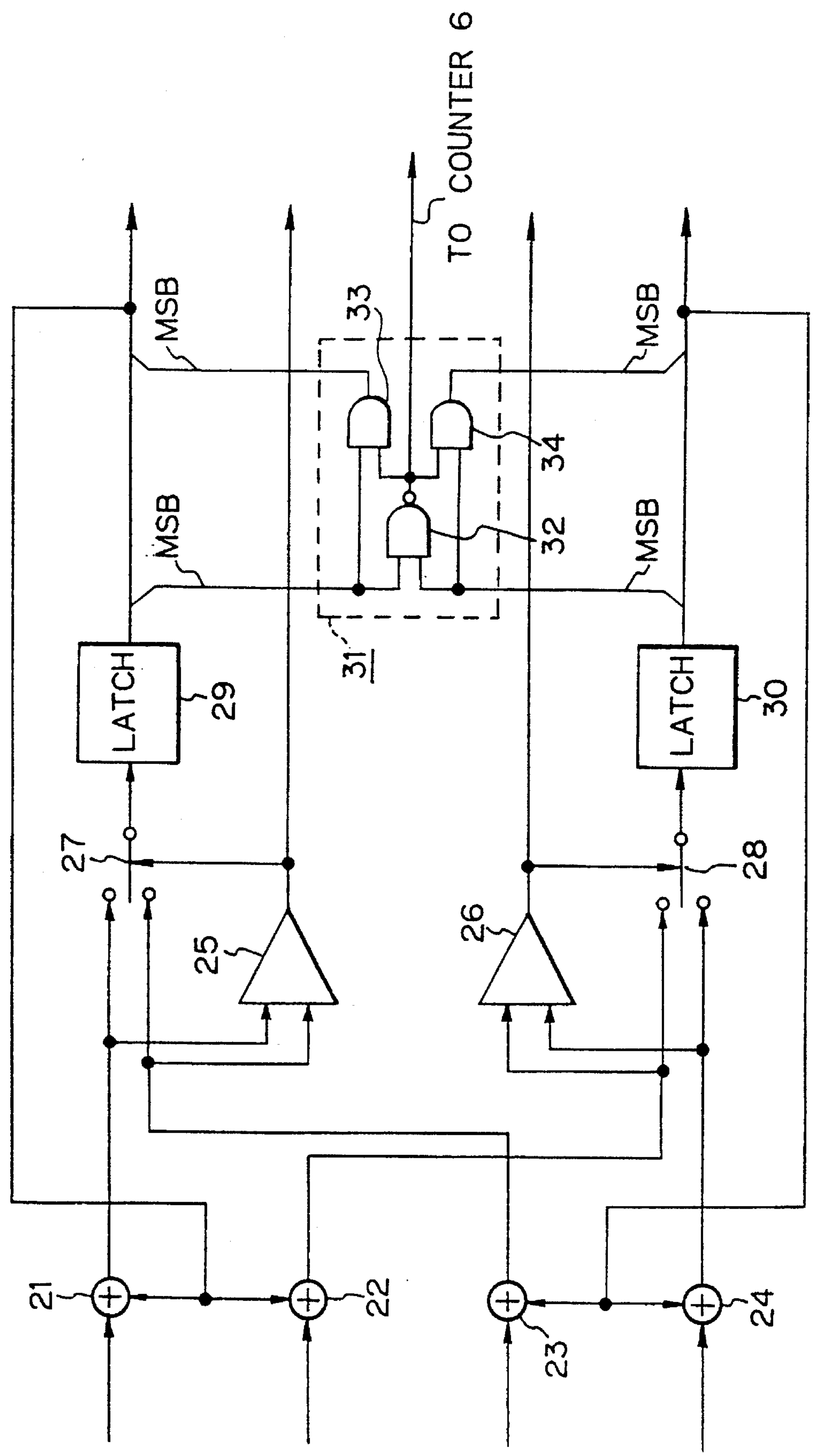
FIG. 4 is a block diagram showing an example of an add/correct/select unit in the Viterbi decoder.

FIG. 4 shows an example of the add/compare/selection circuit 14 for two states. In FIG. 4, reference numbers 21, 22, 23, and 24 are adders which obtain metrics according to the two states. The output signals of the adders 21, and 22 are sent to a comparator 25 and a selector 27, respectively. The comparator 25 forms a path selection signal which selects a smaller metric. The path selection signal causes the selector 27 to be controlled. The smaller metric selected by the selector 27 becomes a path metric and is output through a latch 29. Likewise, a path selection signal and a path metric are obtained by a comparator 26, a selector 28, and a latch 30.

In the figure, a metric limiter 31 is shown by a dotted line. The metric limiter 31 suppresses the dispersion of the metrics received from the latches 29 and 30. The metric limiter 31 comprises an NAND gate 32 and AND gates 33 and 34. The NAND gate 32 receives MSBs from the latches 29 and 30. The AND gate 33 receives the output signal of the NAND gate 32 and the MSB of the output signal of the latch 29. The AND gate 34 receives the output signal of the NAND gate 32 and the MSB of the output signal of the latch 30. The AND gates 33 and 34 each output the MSB of the metric. When both the MSBs of the two metrics are "1", the metric limiter 31 reverses the values of the MSBs to "0" so as to prevent the metrics from being dispersed.

The output signal of the NAND gate 32 of the metric limiter 31 is sent to the counter 6. The counter 6 counts the number of times of "0" of the output signal of the NAND gate 32 so as to detect an increasing amount of metric per track of reproduction data. In the Viterbi decoding for PR (1, 0, −1) code, assume the following conditions. The quantizer is restricted at ±31. The eye aperture A is 31. The dispersion of the noise and equalizing error is σ. The data rate is 30.4 Mbps. The period of one track is 10 msec. In these conditions, the increasing amount ΔM of metric per track is given by the following equation.

$$\Delta M = \frac{2\sigma}{\sqrt{2\pi}} \times 30.4\ \text{Mbps} \times 10\ \text{msec} \times \frac{3}{4} = 1.82\sigma \times 10^5$$

On the other hand, the error occurrence probability Pe of the Viterbi decoding is given by the following equation.

$$Pe = 2\sum_{k=1}^{\infty} \Phi\left(\frac{A}{\sqrt{2 - 2R(2k)\sigma}}\right)\left(\frac{1}{2}\right)^{k-1}$$

Figure 5:
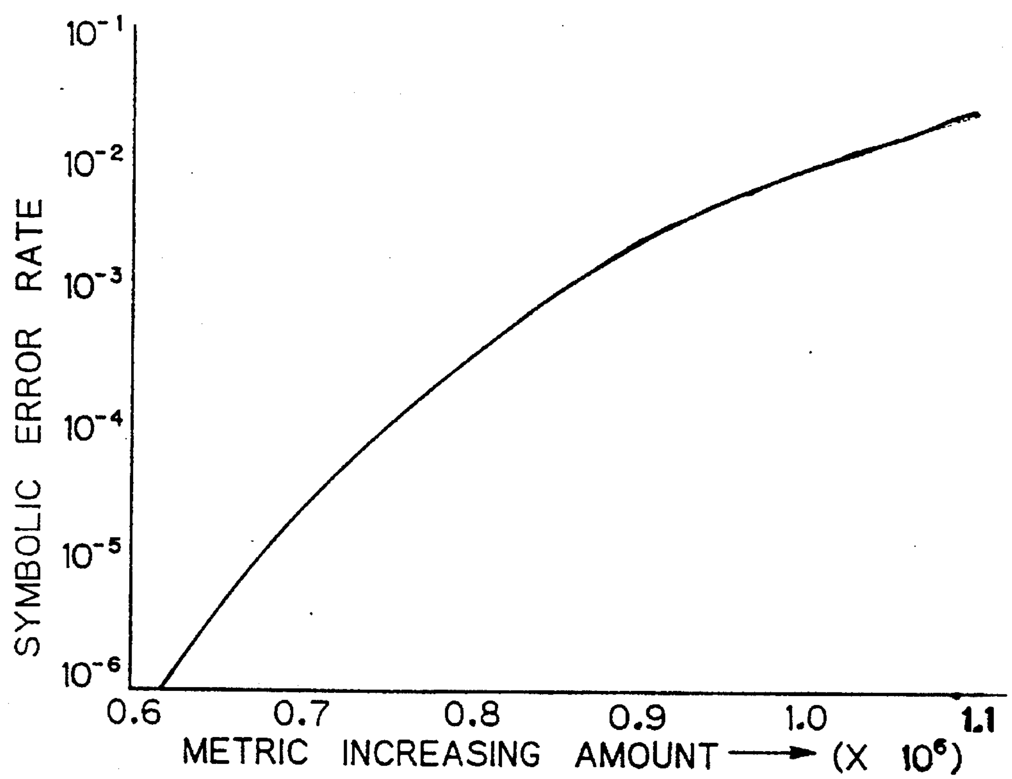
FIG. 5 is a graph showing calculation results of the relation between an increasing amount of metric and symbolic error rate.

Assuming that R(τ), which is an auto-correlation function, has values at τ=±2, when R(2) =−0.5, the error rate of the symbol to the increasing amount of the metric is shown in FIG. 5.

The inventor of the present patent application measured the relation between the increasing amount of metric and symbol error rate corresponding to frequency characteristics of an equalizer used for a prototype digital VTR.

Figure 6:
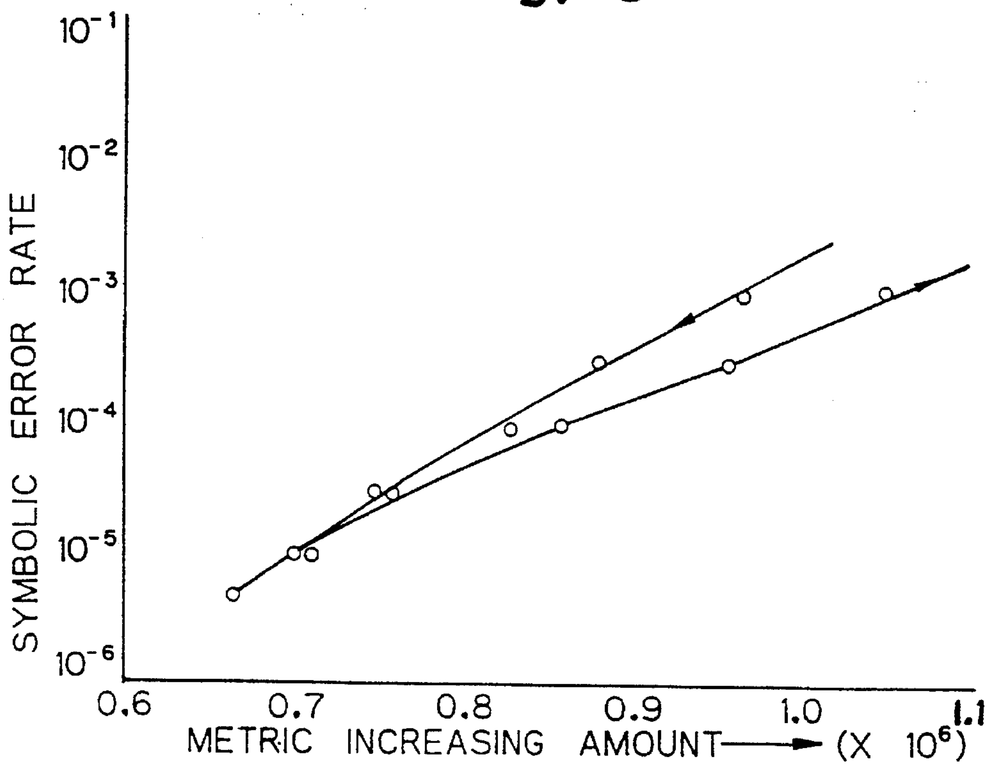
FIG. 6 is a graph showing measured results of the relation between an increasing amount of metric symbolic rate when the frequency characteristics of the equalizer are varied.

FIG. 6 shows the results of such an experiment. In FIG. 6, the increasing amount of the metric per track is shown. The phase of the equalizer is properly set corresponding to the frequency characteristics which are varied. In addition, when the frequency characteristics are optimally set, the variation of the phase of the equalizer can be obtained (this result is not shown).

As is clear from FIGS. 5 and 6, the symbol error rate simply increases corresponding to the increasing amount of the metric. In other words, as the error rate increases, the increasing amount of the metric always increases. For example, when the metric increases by $1\times10^5$, the error rate increases ⅔ times thereof.

Next, the adverse effects of a drop-out is considered. Now, assume that a drop-out takes place for 10 N of 10 msec of one track. Since the dispersion of noise of the drop-out portion is at worst A=31 or less, the increasing amount ΔMdo of the metric of one track is given by the following equation.

$$\Delta Mdo = \frac{2\sigma do}{\sqrt{2\pi}} \times 30.4\ \text{Mbps} \times 10\ \mu\text{sec} \times \frac{3}{4} + 0.999 \cdot \Delta M$$

For example, when the frequency characteristics and the phase of the equalizer are optimally set, the increasing amount εcorresponding to the increasing amount ΔM of the metric is given by the following equation.

$$\epsilon do = \Delta Mdo - \Delta M = 5640 - 0.001 \times 6.64 \times 10^5 = 4980$$

Thus, the increasing amount ε is as small as 0.75% of AM. Since the error rate increases from $5\times10^{-6}$ to $1\times10^{3}$ −it is revealed that even if the error rate is relatively high, the adverse effects of the drop-out is very small.

In the construction shown in FIG. 2, the counter 6 counts the number of times of reversal information received from the metric limiter 31 of the add/compare/select unit 14 and sends the count value to the control circuit 7. The equalizer 3 is controlled so as to minimize the count value. Thus, the RF system is automatically adjusted.

It should be appreciated that the present invention can be applied to the automatic adjustment of the recording RF system as well as the above-described reproducing RF system.

According to the present invention, the automatic adjustment can be performed accurately with less adverse effects of drop-out by detecting less data amount than the conventional error correction circuit which references an error flag.

What is claimed is:

1. A digital signal reproducing circuit for reproducing a digital signal recorded on a recording medium, comprising:

an equalizing circuit for receiving an RF signal reproduced from the recording medium and varying at least one of gain characteristics and phase characteristics thereof with a control signal;

a Viterbi decoder for receiving an output signal of said equalizing circuit; and a control unit for generating said control signal for said equalizing circuit, wherein said control unit is adapted to generate said control signal to control said equalizing circuit so as to minimize an increasing amount of a branch metric of said Viterbi decoder and wherein said control unit comprises:

a counter for counting the increasing amount of the branch metric of said Viterbi decoder; and an arithmetic control unit for generating said control signal fed to said equalizing circuit corresponding to an output of said counter.

2. The digital signal reproducing circuit as set fourth in claim 1, wherein said Viterbi decoder has an add/compare/select unit, said add/compare/select unit having a metric limiter for preventing the metric from being dispersed.

3. The digital signal reproducing circuit as set forth in claim 2, wherein said add/compare/select unit further comprises a plurality of add/select means for obtaining a metric of each state transition of an output signal of said equalizing circuit, and said metric limiter comprises means for receiving MSBs of outputs of said plurality of add/select means and for reversing the values of said MSBS of said outputs when the values of said MSBs are "1".

* * * * *

UNITED STATES PATENT AND TRADEMARK OFFICE

CERTIFICATE OF CORRECTION

PATENT NO. : 5,486,956

DATED : January 23, 1996

INVENTOR(S) : Kaoru Urata

It is certified that error appears in the above-identified patent and that said Letters Patent is hereby corrected as shown below:

In the Abstract, line 2, change ", includes:" to --includes--

Col.1, lines 48 & 49, delete "or enable signal"

Col.2, line 45, after "metric" insert --and a--

Col.3, line 38, change "viterbi" to --Viterbi-- line 45, after "21" delete ","

Col.4, line 46, change "N" to --$\mu$-- line 58, change "Ecorresponding" to -- E corresponding-- line 63, change "AM" to --$\Delta$M-- line 64, change "1 x $10^{3-}$" to --1 x $10^{3}$,--

In the claims,:

Col.6, line 11, change "fourth" to --forth--

Signed and Sealed this

Second Day of December, 1997

Attest:

BRUCE LEHMAN

Attesting Officer

*Commissioner of Patents and Trademarks*